Jan. 22, 1929.
H. D. REY
1,699,990
TRANSMISSION
Filed Oct. 8, 1924
3 Sheets-Sheet 1
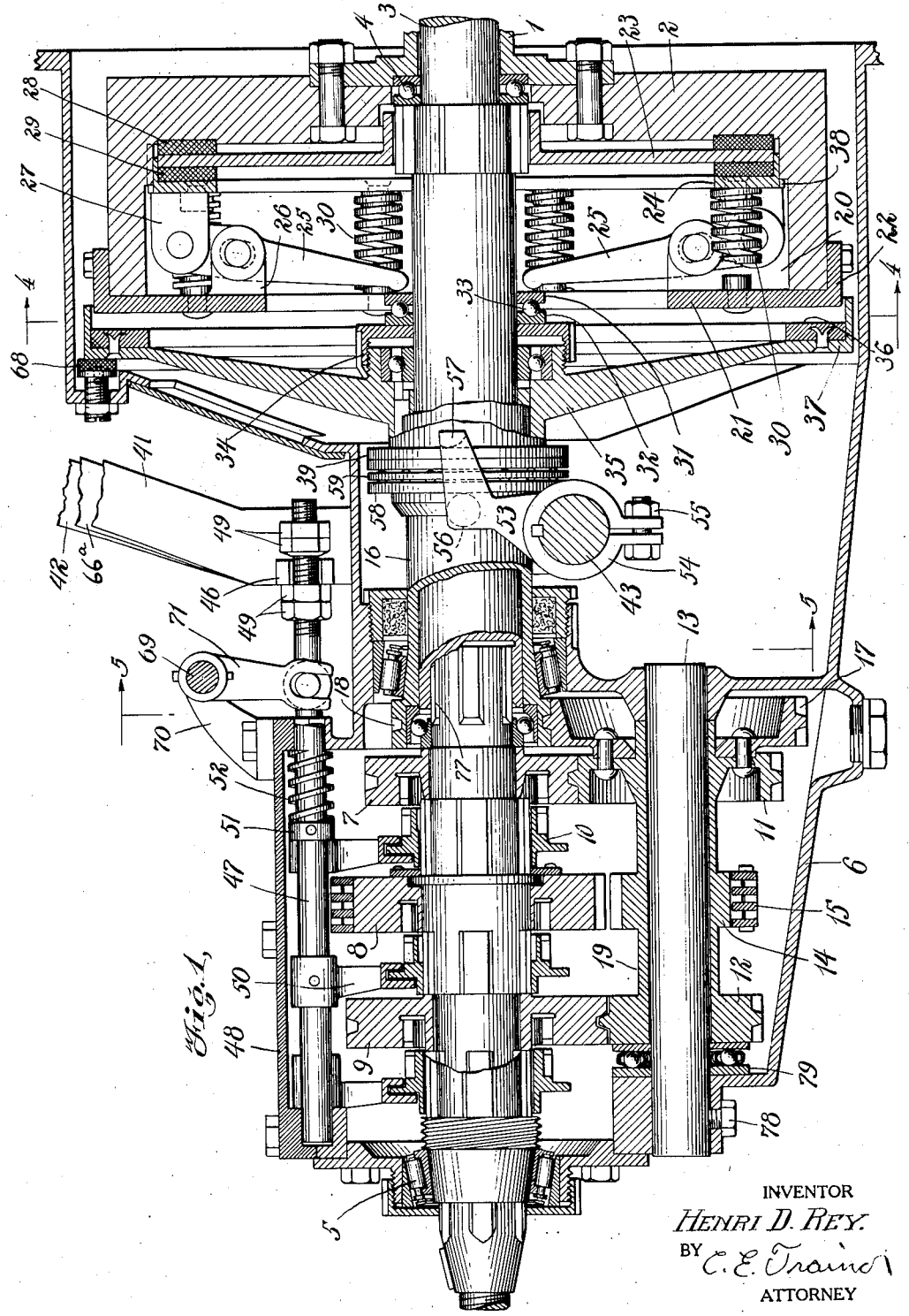
INVENTOR
*Henri D. Rey.*
BY *C. E. Traino*
ATTORNEY Jan. 22, 1929.
H. D. REY
1,699,990
TRANSMISSION
Filed Oct. 8, 1924   3 Sheets-Sheet 2
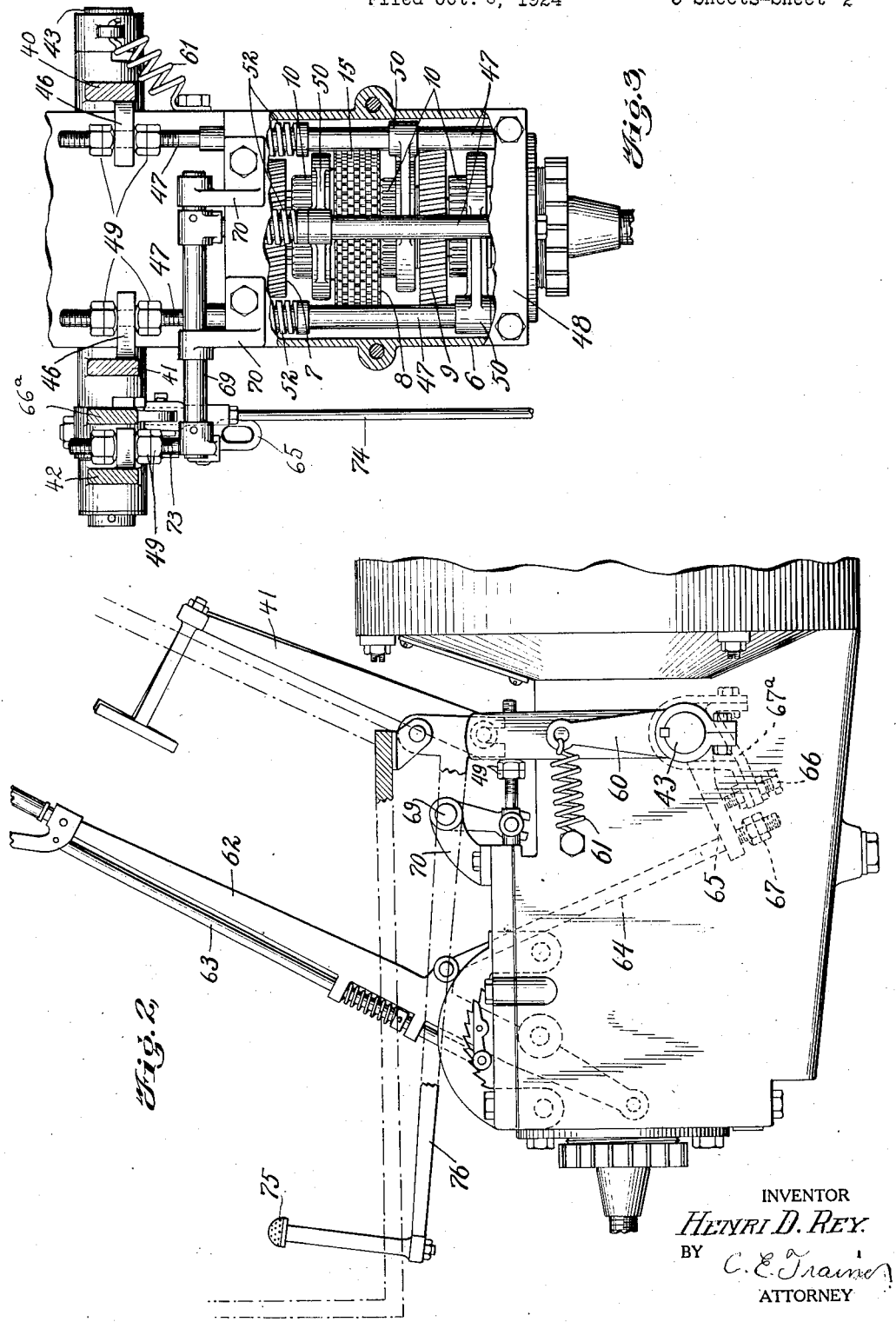
INVENTOR
*Henri D. Rey.*
BY *C. E. Trainer*
ATTORNEY Jan. 22, 1929. 1,699,990
H. D. REY
TRANSMISSION
Filed Oct. 8, 1924    3 Sheets-Sheet 3
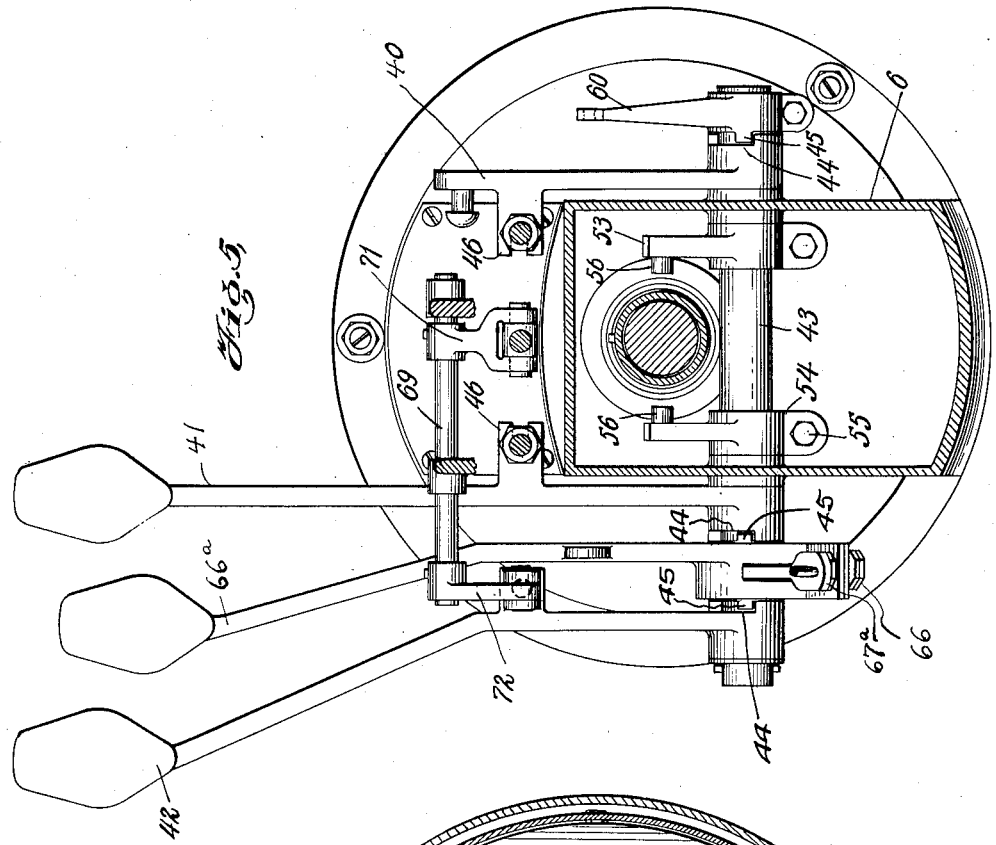
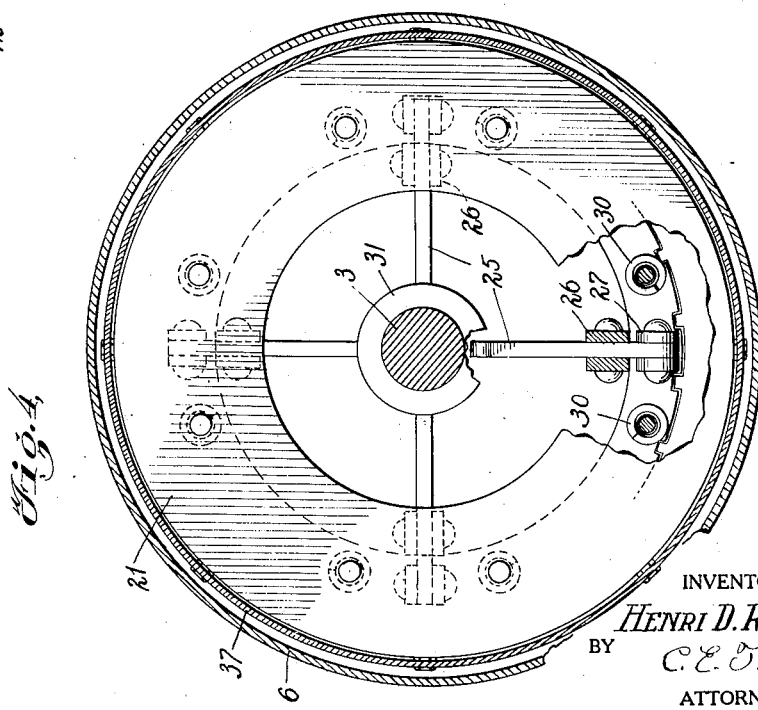
INVENTOR
*Henri D. Rey.*
BY *C. E. Traine*
ATTORNEY Patented Jan. 22, 1929.

UNITED STATES PATENT OFFICE.

HENRI D. REY, OF PAPEETE, TAHITI, SOCIETY ISLANDS.

TRANSMISSION.

Application filed October 8, 1924. Serial No. 742,417.

This invention is an improvement in transmissions, and more particularly in transmissions for motor vehicles.

In the usual construction of such mechanisms, a direct drive connection is provided for the drive and driven shafts, and an indirect drive connection, usually through the intermediary of a third shaft, which for convenience may be termed the transmission shaft.

The selective mechanism by means of which the elements of the variable speed device may be positioned or arranged to give the speed desired, performs the one function of so positioning or arranging the said elements, and a further operation is necessary to operatively connect the said elements with the motor or drive shaft.

Thus two distinct operations are required, and two movements on the part of the driver, to connect the shafts at the desired speed; one to select and "set" the transmission, and the other to connect the drive shaft therewith.

The ultimate aim is usually the high speed or direct drive connection, and to attain the high from any lower speed connection, the indirect drive connection must first be released from the motor shaft, the desired transmission selected, and the indirect drive again connected to the motor shaft.

Three distinct operations, and as many movements on the part of the driver are necessary in passing from one speed to another, and where gears are shifted there is great liability to stripping of the teeth.

An object of the present invention is the provision of a transmission wherein the mechanism which selects the speed and arranges the parts in operative position with respect to the driven shaft, will also place them in operative position with respect to the drive shaft, by a single movement of said selective mechanism in one direction, and wherein by simple changes in the relationship of certain adjustable parts, such operations may be caused to take place in sequence or coincidently.

Another object is to provide a transmission wherein the direct drive connection is normally operative, and is operated to release position by certain controlling elements of the transmission, in sequence with their normal function, and as a result of a single movement of the element in one direction.

Another object is the provision of a construction such that with minor changes in the relation of certain adjustable parts, the normally operative direct drive connection will be positively operated to release position by the initial movement of the selective speed operating means.

Another object is the provision of an indirect drive connection for the speeds other than high, so constructed and arranged that in operation, and especially in starting, the torque of the motor shaft is materially reinforced by increased leverage in the connection.

Another object is the provision of a transmission wherein the usual means for applying the brakes will also operate the releasing mechanism for the direct drive connection, prior to the full application of the brakes.

Another object is the provision of a transmission wherein all of the elements cooperating to connect the shafts at other than high speed, occupy fixed relative positions with respect to each other and to the shafts, and are idle when the shafts are directly connected.

Another object is to provide in connection with the transmission, means to brake the transmission shaft, thereby to immobilize the variable speed elements, controlled to braking by the release of the shaft from the drive shaft.

Another object is to provide a construction with the improvements above specified incorporated, without change in shape, size or relationship of the elements of the variable speech mechanism, and without departure from the recognized standards of construction With these and other objects in view, the invention consists in the construction and novel combination of parts fully described hereinafter, illustrated in the accompanying drawings, and pointed out in the claims appended; it being understood that various changes in the form, proportion, size and minor details of construction, within the scope of the claims, may be resorted to without departing from the spirit of the invention.

In the drawings forming a part hereof;

Figure 1 is longitudinal section of the improved transmission, with the parts in the direct drive position.

Figure 2 is a side elevation of the forward end of the casing, with parts broken away.

Figure 3 is a top plan view, with the casing in section.

Figures 4 and 5 are sections taken on the lines 4—4 and 5—5 respectively, of Figure 1.

In the present embodiment of the invention the end of the motor or driving shaft 1 to which the fly-wheel 2 is secured, is recessed to receive the adjacent end of the driven shaft 3. The shaft 3 is journaled in a ball bearing 4 in the fly wheel, and in a roller bearing 5 in the opposite end of the transmission casing 6, which encloses the transmission mechanism to be described, and the fly-wheel.

Within the casing 6 a plurality of gear wheels 7, 8 and 9 is loosely journaled on the shaft 3, and each of the wheels contains in itself one of the elements of a clutch, in the form of longitudinal recesses in one face thereof, and designed to receive teeth on the other element of the clutch, the said element for each wheel being a sleeve or collar 10, feathered on the shaft. The gear wheels 7 and 9 mesh with gear wheels 11 and 12, respectively, on a counter shaft 13, also journaled in the casing 6, and the wheel 8 is connected to a wheel 14 on the counter shaft by means of a chain 15 in the present instance, though it is obvious that the connection might be by means of another gear if desired.

When a chain is used, as in the present instance, the wheels 8 and 14 are sprocket wheels, but for convenience of description they will be described as gear wheels, and all of the wheels, including the wheels 8 and 14 when they are connected by an idler, are preferably of the spiral type. The wheels 9 and 12 provide for the low speed, the wheels 7 and 11 the intermediate, and the wheels 8 and 14 for the reverse, each pair of wheels constituting an indirect connection between the shafts under conditions to be described.

The wheels on the counter shaft 13 are connected to a transmission shaft 16, which in the present instance is a hollow shaft or sleeve, journaled on the driven shaft, by means of gear wheels 17 and 18, the former rigid with the wheel 11, and the latter integral with the transmission shaft. In the present instance the wheels 11, 12 and 14 are integral with a sleeve 19 loose on the counter shaft.

Mechanism is provided for connecting the driving shaft with either the transmission shaft or the driven shaft, and the said mechanism operates in alternation, the arrangement being such that one must be disconnected before the other can be connected. The face of the fly wheel remote from the motor shaft is recessed, as shown at 20, and a ring 21 is secured to the said face, the ring having a flange 22 engaging about the periphery of the wheel and secured thereto. The ring extends inwardly to cover a portion of the recess, and supports the movable element of the clutch which directly connects the shafts 1 and 3. The ring is also the fixed part or element of the clutch which indirectly connects the shafts through the transmission or variable speed mechanism.

The first named clutch is constituted by a disk 23, feathered on the driven shaft, and a ring 24 supported by the ring 21 before mentioned. A plurality of levers 25 is supported by the ring 21, each pivoted intermediate its ends to a lug 26 on the inner face of the ring, and at its out-end to a lug 27 on the clutch ring 24. The disk 23 may move toward and from the fly-wheel but must rotate with the driven shaft, and lining rings 28 and 29 are arranged at opposite faces of the disk, the former on the fly-wheel, and the latter on the ring 24. The clutch ring is normally pressed toward the disk by springs 30, each of which is connected at one end to the ring 24, and at the other to the ring 21.

The inner ends of the levers 25 are in position for engagement by an operating washer or ring 31, slidable on the shaft 3, and the washer is separated from another washer 32 by a thrust bearing 33. The washer 32 bears against the face of a cup-shaped member 34 which has threaded engagement with the hub of a spider 35, journaled on the driving shaft. The spider carries a clutch ring 36, which is secured within the angle shaped ring member 37, integral with the spider arms, and forming a part of the spider.

It will be evident that when the spider is moved toward the disk 23, the levers will first be operated to move the ring 24 outward, away from the disk 23, thus releasing the inner clutch which directly connects the shafts 1 and 3, and that further movement of the spider will cause the ring 36 to engage the ring 21, thus to clutch the transmission shaft 16 to the fly-wheel and to the drive shaft. By turning the cap or cup-shaped member 34 in the proper direction, the position of the washer 31 may be changed with respect to the levers, thus to vary the relative positions of the rings 24 and 36. The ring 24 has a feathered connection with the fly-wheel, indicated at 38, which constrains the ring to rotate with the wheel, but permits longitudinal movement with respect thereto.

The spider is moved by selective mechanism to be described, engaging an annular flange 39 on the hub of the spider, the said mechanism including a plurality of levers, three in the present instance, controlling the reverse, the low and the intermediate speeds. The levers 40, 41, and 42 are mounted on a shaft 43 journaled transversely of the casing 6, and are connected thereto in such manner that each may be moved forwardly to turn the shaft without affecting the others. They are also connected in such manner that each has a limited lost motion with respect to the shaft, so that the spring 52 is under compression before the shaft begins to move.

The said connection includes a notch 44 in the hub of each lever, and a lug 45 on the shaft, moving in the notch. Each lever has a laterally extending lug 46, notched to slidably receive a rod 47, slidably mounted in the cover 48 of the casing 6, and removable from the casing therewith. Each slide rod is threaded at the end adjacent the lug 46, and lock nuts 49 are arranged on opposite sides of the lug, so that the rod may be adjusted longitudinally with respect to the lug. An arm 50 is pinned on each rod, within the casing, and the arms of the several rods are rotatably connected with the movable clutch members 10 of the variable speed mechanism. Each rod has a stop collar 51 near its forward end, and a spring 52 encircles each rod between the collar and the casing wall, the springs acting normally to retract the levers, and to release the variable speed mechanism.

A pair of arms 53 is adjustably connected to the shaft 43, inside the casing 6, by means of a split bearing 54, clamped on the shaft by a bolt and nut 55, and each arm has an angular portion at its free end provided with a pair of spaced lugs 56 and 57. The lugs 57 engage in front of the flange 39, while the lugs 56 engage behind a washer 58 on the spider hub, and separated from the flange by a ball bearing 59. An arm 60 is rigidly secured to the end of the shaft 43 adjacent the lever 40, and a spring 61 is arranged between the arm and a stop on the casing wall, the spring acting to move the spider rearwardly.

It will be evident from the description of the parts, that when any lever of the selective mechanism is pushed forwardly, the inner fly-wheel or direct drive clutch will first be moved toward neutral or release position, it being understood however that the said clutch may be moved into release position and so held by mechanism to be later described. Then the train of gears pertaining to that lever will be clutched to the driven shaft, and afterwards the transmission shaft will be clutched to the motor or drive shaft. By means of the nuts 49 the relative time of operation of the gear train-driven shaft and the transmission shaft-drive shaft connections may be varied, to cause the connections to be made in sequence, as described, or coincident. Reverse movement of the lever will first release the transmission shaft from the drive shaft and afterwards the gear train from the driven shaft, although the operations may be made coincident as above mentioned. The return movement of the lever releases the springs 30 which at once operate to set the direct drive clutch, unless their operation is restrained by mechanism referred to above and to be described.

The said mechanism includes the usual emergency brake lever 62, found on all cars, and a connection between the lever and the shaft 43. The lever 62 has the usual latch mechanism 63, and a link 64 connects the lever with an arm 65, rigid with the shaft 43. The connection is by means of an opening in the arm through which the link 64 passes, and the link is engaged by nuts 67 below the arm. The connection between the link 64 and the arm 65 is such that the lever may move in one direction, forwardly, without effecting the shaft 43, but a rearward movement beyond a certain point will operate the arm to oscillate the shaft.

An adjustable stop 66 is provided in connection with an angular extension 67$^a$ from the lower end of the brake pedal 66$^a$, which is journaled on the shaft 43. The stop 66 bears against the arm 65 so that when the brake pedal is moved forwardly, the shaft 43 is oscillated. By means of the lever 62 or the brake pedal 66$^a$, the direct drive clutch may be disconnected, and it may be held in released position by the lever 62 held by its latch mechanism, or by the brake pedal held by the foot of the driver. The direct drive clutch is normally operative. When the brake pedal is moved forwardly to apply the brakes, it first operates to release the main clutch.

Mechanism is also provided for immobilizing the variable speed mechanism or gear trains when the transmission shaft is released from the drive shaft, and controlled by the release of the said shafts. The said mechanism includes a brake shoe 68, adjustably connected to the casing 6, and engaged by the plane periphery of the spider ring 37, when the spider is moved rearwardly. The shoe is adjusted in accordance with the adjustment of the nuts 49, the cap 34, and the stop 66. The cap 34 may also be adjusted to compensate for wear of the rings 28, 29.

The lever 42 is well to the side of the casing 6, and the middle slide rod 47 which it operates. For this reason a shaft 69 is journaled transversely above the casing in bearing arms 70, and the slide and lever are connected to radial arms 71 and 72 on the shaft, the connection of the lever with the arm 72 being through the intermediary of a link 73, and the adjusting nuts 49 are on the link. The brake pedal 66$^a$ is connected to the brake mechanism by a link 74, and in the present instance the reverse is operated by a push button 75, positioned to be engaged by the heel of the driver, and mounted on the end of a lever 76 of general T-shape. One arm of the T is pivoted to the footboard, and the other arm to the upper end of the lever 40.

It will be understood that any preferred form of connection may be used in the variable speed device. As for instance, chains may be used in the low and intermediate speeds, and a gear train without an idler for the reverse.

While I have shown the speed selective mechanism and the transmission shaft-drive shaft connection operated by the pedal controlling the speed selected, it will be obvious that the usual lever selective mechanism might be used for connecting the gear train to the driven shaft. In this case only one pedal would be used to operate the direct and indirect drive clutches. While the shaft 3 might be continuous through the gear casing, I prefer to make it in two parts, as shown, connected by a socket clutch 77. This is for convenience in removing the variable speed device from the casing. The rear end of the counter shaft extends through the rear end of the casing, so that it may be withdrawn from the casing and from the sleeve 19, and when in place it is held by a set screw 78. A thrust bearing 79 is on the shaft between the end of the casing and the gear 12, especially when spiral gears are used.

In operation to start the car, it being understood that at this time the direct drive clutch is held in neutral position by the emergency brake, the pedal of the selected speed is pushed forward, thus connecting the gear train of the selected speed to the driven shaft, and afterwards the transmission shaft to the drive shaft. To pass to the next speed the pedal is released, and that pertaining to the next speed is operated in the same manner. If it is desired to pass from the selected speed directly to the high speed, the emergency brake lever is released, and the pedal of the selected speed is also released. The reverse movement of the pedal releases the transmission shaft from the drive shaft, releases the gear train from the driven shaft, and permits the springs 30 to operate the direct drive clutch.

By a single movement of the brake pedal the direct drive clutch may be disconnected, and the brake applied. Or by proper adjustment of the nuts 49, the cap 34, the brake shoe 68 and the stop 66, the parts may be so arranged that a forward movement of any selective speed pedal will release the direct drive clutch before it engages the selected gear train with the driven shaft.

What I claim is:

1. Transmission mechanism including a drive and a driven shaft, means to directly connect the shafts, means to indirectly connect the shafts, a common means moving in one direction to release one of said means and to connect the other, the said means including a fly-wheel on the drive shaft common to both means, a clutch engaging within the wheel for the first means, a clutch outside the wheel for the second means, the indirect connection including a plurality of gear trains, and means operated by the first named means to immobilize the trains when the shafts are directly connected.

2. Transmission mechanism including a drive and a driven shaft, means to directly connect the shafts, means to indirectly connect the shafts, a common means moving in one direction to release one of said means and to connect the other, the indirect connection including a plurality of gear trains normally disconnected from the driven shaft, and means whereby the common means will connect one of the trains to the driven shaft prior to the connection of the train to the drive shaft.

3. Transmission mechanism including a drive and a driven shaft, means to directly connect the shafts, means to indirectly connect the shafts, and a common means moving in one direction to release one of said means and to connect the other, the indirect connection including a plurality of gear trains, and means operated by the first named means to immobilize the trains when the shafts are directly connected.

4. In a transmission mechanism, the combination with the drive and the driven shafts, of normally operative means to directly connect the shafts, normally inoperative means to indirectly connect the shafts, including a variable speed device, selective mechanism for the variable speed device, and connections between the selective mechanism and the direct and indirect connecting means enabling the selective mechanism when selecting a speed to first release the direct connection and afterwards connect the indirect connection 5. In a transmission, the combination with the drive and the driven shafts, of a normally operated direct connection for the shafts, a variable speed device for indirectly connecting the shafts, and selective mechanism for operating the variable speed device having means to release the direct connection prior to connecting the shafts indirectly, and means to brake the variable speed device when the indirect connection is released 6. In a transmission, the combination with the drive shaft and the driven shaft, of a normally operative direct connection for the shafts, a variable speed device including a plurality of gear trains for indirectly connecting the shafts, and selective mechanism for operating the variable speed device having means to release the direct connection prior to connecting the shafts indirectly and other means to hold the gears immobile when the shafts are directly connected.

7. In a transmission, the combination with the drive and the driven shafts, of a flywheel on the drive shaft, means engaging within the wheel to directly connect the shafts, a variable speed device for indirectly connecting the shafts including a clutch element engaging the periphery of the wheel, said element having means to release the direct connection prior to its engagement with the wheel, and means operated by the release of the clutch element to immobilize the speed device.

8. In a transmission, the combination with the drive and the driven shafts, of a flywheel on the drive shaft, means engaging within the wheel to directly connect the shafts, a variable speed device for indirectly connecting the shafts including a clutch element engaging the periphery of the wheel, said element having means to release the direct connection prior to its engagement with the wheel, means operated by the release of the clutch element to immobilize the speed device, and selective mechanism to operate the clutch.

9. In a transmission, the combination with the drive and the driven shafts, of a flywheel on the drive shaft, means engaging within the wheel to directly connect the shafts, a variable speed device for indirectly connecting the shafts including a clutch engaging the periphery of the wheel, the clutch having means to release the direct connection prior to its engagement with the wheel, and selective mechanism for the variable speed device operating the last named clutch to connect the selective speed to the drive shaft.

10. In a transmission, the combination with the drive and the driven shafts, of a fly-wheel on the drive shaft, means engaging within the wheel to directly connect the shafts, a plurality of means to indirectly connect the shafts, mechanism to connect the selected means to the driven shaft and to the drive shaft including a clutch engaging the periphery of the wheel, means operated by said mechanism to release the direct connection prior to the engagement of the clutch, and means operated by the release of the clutch to immobilize the indirect connecting means.

11. In a transmission, the combination with the drive and the driven shafts, of a variable speed device including a plurality of means to indirectly connect the shafts, each means including a wheel loose on the driven shaft, and a wheel operatively connected therewith, said last named wheels rigidly connected, a clutch for connecting each of the first named wheels to the driven shaft, means to operate each of the clutches, and to afterwards connect the last named wheels to the drive shaft, a direct drive connection for the shafts, and means operated by any of the clutch operating means to release the said connection prior to the connection of the last named wheels to the drive shaft.

12. In a transmission, the combination with the drive and the driven shafts, of a variable speed device including a plurality of means to indirectly connect the shafts, a means for connecting each of said means to the driven shaft and for afterwards connecting the selected means to the drive shaft, a direct drive connection for the shafts, and mechanism operated by each of said connecting means to release the direct drive connection prior to the connection of the selected indirect connection to the drive shaft.

13. In a transmission, the combination with the drive and the driven shafts, of a variable speed device including a plurality of means to indirectly connect the shafts, means to connect each of said means to the driven shaft and to afterwards connect it to the drive shaft, and means operated by the restoration of any of the indirect connecting means to release position to immobilize the speed device.

14. In a transmission, the combination with the drive and the driven shafts, of clutch elements for connecting the shafts directly or indirectly, the indirect connection including a variable speed device, selective mechanism controlling the variable speed device and the indirect connection clutch, means normally urging the direct connection clutch to operative position, mechanism operated by the selective mechanism at the beginning of its movement to release the direct connection, and independent means to hold the said clutch in neutral position.

15. In a transmission, the combination with the drive and the driven shafts, of a variable speed connection including a plurality of means to indirectly connect the shafts, an independent clutch for connecting each of said means to the driven shaft, a single clutch for connecting all of said means to the drive shaft, and a lever for each independent clutch moving in one direction and having connections with the independent clutch and the common clutch to first operate the independent clutch of the selected means and afterwards the common clutch.

16. In a transmission, the combination with the drive and the driven shafts, of a variable speed device including a plurality of means to indirectly connect the shafts, independent mechanism for connecting each of said means to the driven shaft, a common mechanism for connecting all of said means to the drive shaft, and a lever moving in one direction and having connections with the independent mechanism and the common mechanism to operate first the independent mechanism and afterwards the common mechanism.

17. In a transmission, the combination with the drive and the driven shafts, of a variable speed device including a plurality of means to indirectly connect the shafts, selective mechanism moving in one direction to first connect the selected means to the driven shaft and afterwards to the drive shaft, and means operated by the reverse movement of the said mechanism to immobilize the variable speed device.

18. In a transmission, the combination with the drive and the driven shafts, of a variable speed device including a plurality of means to indirectly connect the shafts, selective mechanism moving in one direction to first connect the selected means to the driven shaft and afterwards to the drive shaft, a normally operative direct connection for the shafts, and means whereby the initial movement of the selective mechanism will release the direct connection.

19. In a transmission, the combination with the drive and the driven shafts, of a variable speed device including a plurality of means to indirectly connect the shafts, selective mechanism moving in one direction to first connect the selected means to the driven shaft and afterwards to the drive shaft, a normally operative direct connection for the shafts, means whereby the initial movement of the selective mechanism will release the direct connection, and independent means to hold the said connection in neutral position.

20. In a transmission, the combination with the drive and the driven shafts, of a variable speed device including a plurality of means to indirectly connect the shafts, selective mechanism moving in one direction to first connect the selected means to the driven shaft and afterwards to the drive shaft, a normally operative direct connection for the shafts, means whereby the initial movement of the selective mechanism will release the direct connection, a brake lever, and connections between the lever and the said means to release the direct connection prior to the application of the brake.

21. In a transmission mechanism, the combination with the drive shaft, the driven shaft, and a variable speed device including a transmission shaft for connecting the selected speed with the drive shaft, a flywheel on the drive shaft, a plurality of clutch devices to connect the flywheel with the driven shaft directly, or with the transmission shaft, one of said devices engaging within the wheel and the other engaging the periphery thereof, said first named device providing the direct connection, normally operative and released by the movement of the last named device to operative position, selective mechanism for the variable speed device, and means operated by said mechanism in selecting a speed to move said last named device to operative position when the speed has been selected.

In testimony whereof he affixes his signature.

HENRI D. REY.